(12) United States Patent
Koyama et al.

(10) Patent No.: US 7,868,963 B2
(45) Date of Patent: Jan. 11, 2011

(54) OPTICAL MODULATION ELEMENT UNIT, PROJECTION OPTICAL UNIT, AND IMAGE PROJECTION APPARATUS

(75) Inventors: Takehiro Koyama, Utsunomiya (JP);
Toru Miura, Utsunomiya (JP);
Hidetomo Tanaka, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 220 days.

(21) Appl. No.: 11/444,829

(22) Filed: May 31, 2006

(65) Prior Publication Data

US 2006/0274412 A1    Dec. 7, 2006

(30) Foreign Application Priority Data

Jun. 1, 2005   (JP)   ............... 2005-162047
May 24, 2006   (JP)   ............... 2006-144356

(51) Int. Cl.
    *G02F 1/1333*    (2006.01)
    *G02F 1/1335*    (2006.01)
    *G02F 1/153*    (2006.01)
    *G02F 1/29*    (2006.01)
    *G03B 21/14*    (2006.01)

(52) U.S. Cl. ............... 349/58; 349/5; 349/113; 353/119; 359/267; 359/318

(58) Field of Classification Search ...... 349/5, 349/58; 353/119; 359/267, 318
See application file for complete search history.

(56) References Cited

U.S. PATENT DOCUMENTS

| | | | |
|---|---|---|---|
| 5,808,795 A * | 9/1998 | Shimomura et al. | 359/488 |
| 6,844,979 B2 * | 1/2005 | Maki et al. | 359/629 |
| 2002/0036819 A1 | 3/2002 | Watanabe | |
| 2002/0047999 A1 | 4/2002 | Shiraishi et al. | |
| 2004/0223237 A1 | 11/2004 | Yanagisawa et al. | |

(Continued)

FOREIGN PATENT DOCUMENTS

JP    10-319379    12/1998

(Continued)

OTHER PUBLICATIONS

Communication dated Aug. 21, 2007 from EPO Office concerning appln 06011257.0-2209 including European Search Report and comments.

*Primary Examiner*—Mark A Robinson
*Assistant Examiner*—Paisley L Arendt
(74) *Attorney, Agent, or Firm*—Rossi, Kimms & McDowell LLP

(57) ABSTRACT

An optical modulation element unit is disclosed which employs a film-type optical function member and a reflective optical modulation element and allows dust prevention for the reflective optical modulation element while preventing an increased number of parts other than optically required parts. The optical modulation element unit includes a light-transmissive substrate, a film-type optical function member attached to the light-transmissive substrate, a reflective optical modulation element separately placed from the light-transmissive substrate, a cover member which surrounds a space between the light-transmissive substrate and the reflective optical modulation element, and a holding member which holds the light-transmissive substrate. The holding member has a guide portion which guides an air flow to a space along a surface of the light-transmissive substrate, the surface being a surface on the side opposite to the reflective optical modulation element.

8 Claims, 14 Drawing Sheets

U.S. PATENT DOCUMENTS

| | | |
|---|---|---|
| 2005/0001985 A1 | 1/2005 | Kitabayashi |
| 2005/0094107 A1 | 5/2005 | Gishi et al. |

FOREIGN PATENT DOCUMENTS

| | | |
|---|---|---|
| JP | 2003-177382 | 6/2003 |
| JP | 2004-219971 | 8/2004 |
| JP | 2005-134814 | 5/2005 |

* cited by examiner

OPTICAL MODULATION ELEMENT UNIT, PROJECTION OPTICAL UNIT, AND IMAGE PROJECTION APPARATUS

BACKGROUND OF THE INVENTION

The present invention relates to a reflective optical modulation element unit for use in an image projection apparatus such as a projector, and to a projection optical unit having the optical modulation element unit.

A liquid crystal projector has a liquid crystal panel serving as an optical modulation element which modulates illumination light in accordance with image information input thereto and also has a projection lens which projects the modulated light onto a screen to display an image on the screen.

Japanese Patent Laid-Open No. 10(1998)-319379 has disclosed a liquid crystal projector which includes a dustproof structure for a liquid crystal panel and a cooling structure for the liquid crystal panel to improve the quality of a projected image. The projector has a cover glass provided for each of the front and the back of a transmission-type liquid crystal panel to provide a dustproof sealing space between the cover glasses and the transmission-type liquid crystal panel. Cooling wind is flowed along the cover glass surfaces to cool the transmission-type liquid crystal panel. The cover glass is disposed at a considerable distance from the liquid crystal panel to increase an amount of defocusing of a projection lens for any dust adhered to the outer surface of the cover glass to make the dust inconspicuous in the projected image.

On the other hand, each of Japanese Patent Laid-Open No. 2003-177382 and Japanese Patent Laid-Open No. 2004-219971 has disclosed a dustproof structure for a reflective liquid crystal panel used in a projector. In these disclosed structures, a dustproof cover surrounds the entire space from a beam splitter to the liquid crystal panel including optical function members such as a quarter-wave plate disposed between the beam splitter and the liquid crystal panel.

Some of the optical function members including the quarter-wave plate are made of crystal and others are of a film type. The film-type optical function members are suitable for realizing an optical system having a low F-number to illuminate the liquid crystal panel, that is, for displaying a bright image.

However, as seen in the structure disclosed in Japanese Patent Laid-Open No. 10(1998)-319379, the cover glasses for the dustproof purpose disposed at a large distance from the liquid crystal panel increase the number of parts other than the optically required parts and increase the length of the back focus from the projection lens by the distance from the liquid crystal panel to the cover glass. As a result, the overall optical system is increased in size.

On the other hand, the structures disclosed in Japanese Patent Laid-Open No. 2003-177382 and Japanese Patent Laid-Open No. 2004-219971 employ the dustproof structure in which the cover member surrounds the entire space between the beam splitter and the liquid crystal panel, so that the air within the dustproof structure cannot be circulated and thus the quarter-wave plate disposed in the dustproof structure cannot be cooled. For this reason, a heat-resistant quarter-wave plate made of crystal is used, not a quarter-wave plate of the film type susceptible to heat. However, the quarter-wave plate made of crystal leads to difficulty in realizing an illumination optical system with a low F-number.

BRIEF SUMMARY OF THE INVENTION

It is an object of the present invention to provide an optical modulation element unit which employs a film-type optical function member and a reflective optical modulation element and allows dust prevention for the reflective optical modulation element while preventing an increased number of parts other than optically required parts, and a projection optical unit having the optical modulation element unit, and an image projection apparatus having the optical modulation element unit. It is another object of the present invention to allow efficient cooling of the film-type optical function member in the abovementioned optical modulation element unit. According to one aspect, the present invention provides an optical modulation element unit which has a light-transmissive substrate, a film-type optical function member attached to the light-transmissive substrate, a reflective optical modulation element separately placed from the light-transmissive substrate, a cover member which surrounds a space between the light-transmissive substrate and the reflective optical modulation element, and a holding member which holds the light-transmissive substrate. The holding member has a guide portion which guides an air flow to a space along a surface of the light-transmissive substrate, the surface being disposed on the side opposite to the reflective optical modulation element.

According to another aspect, the present invention provides a projection optical unit which includes the abovementioned optical modulation element unit, an image projection apparatus which includes the projection optical unit, and an image projection system which includes the image projection apparatus and an image supply apparatus.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 1:
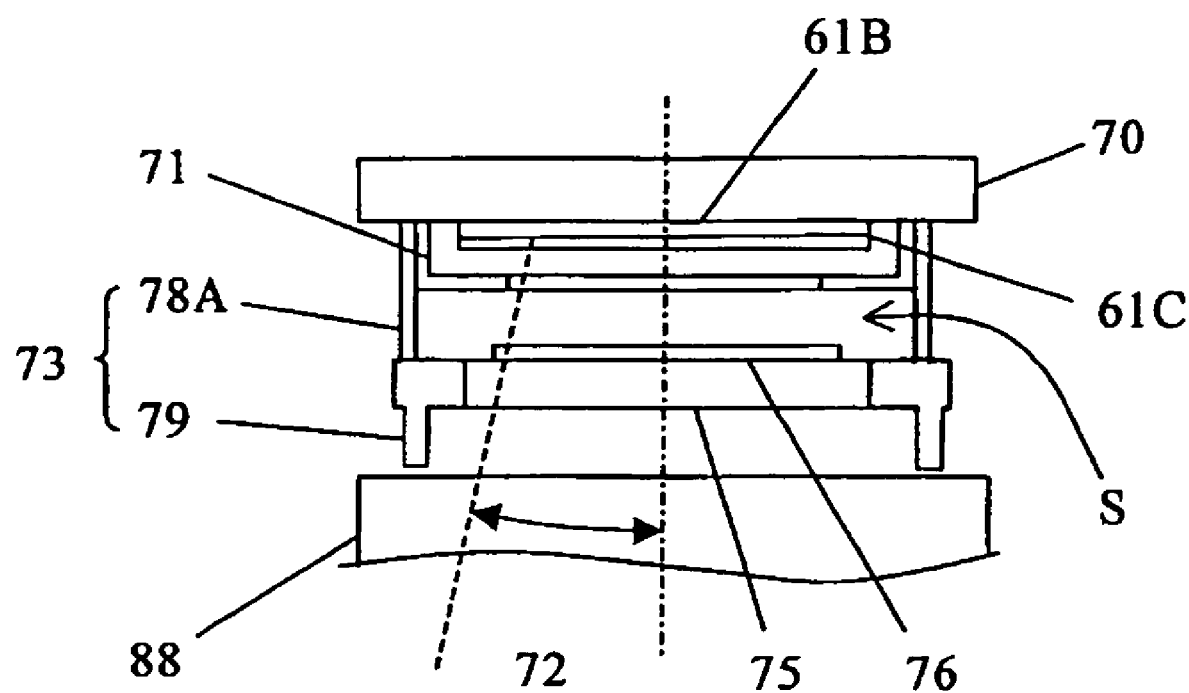
FIG. 1 is a section view of a liquid crystal element unit which is Embodiment 1 of the present invention.
Figure 2:
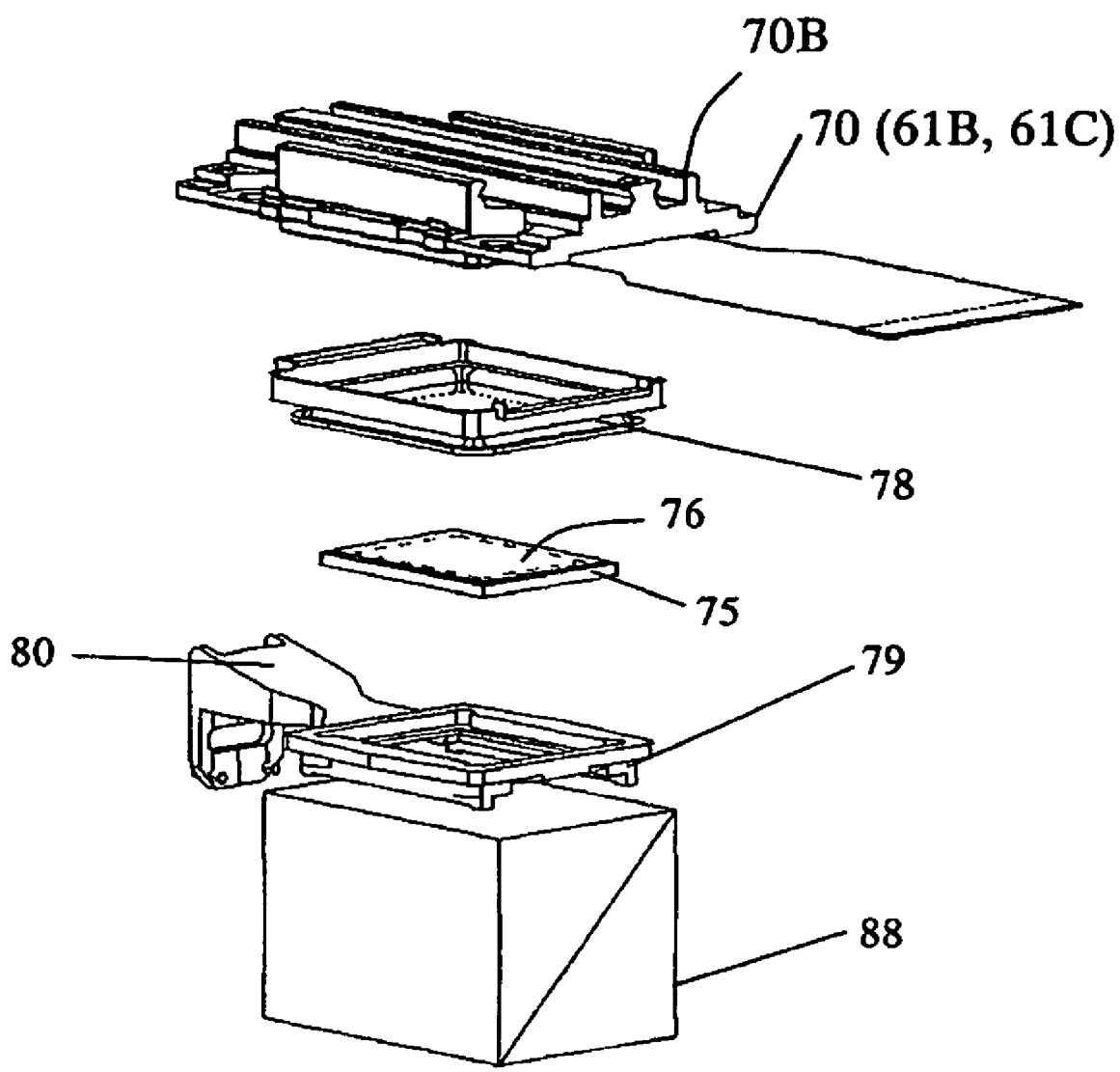
FIG. 2 is an exploded perspective view of the liquid crystal element unit of Embodiment 1.
Figures 3A, 3B:
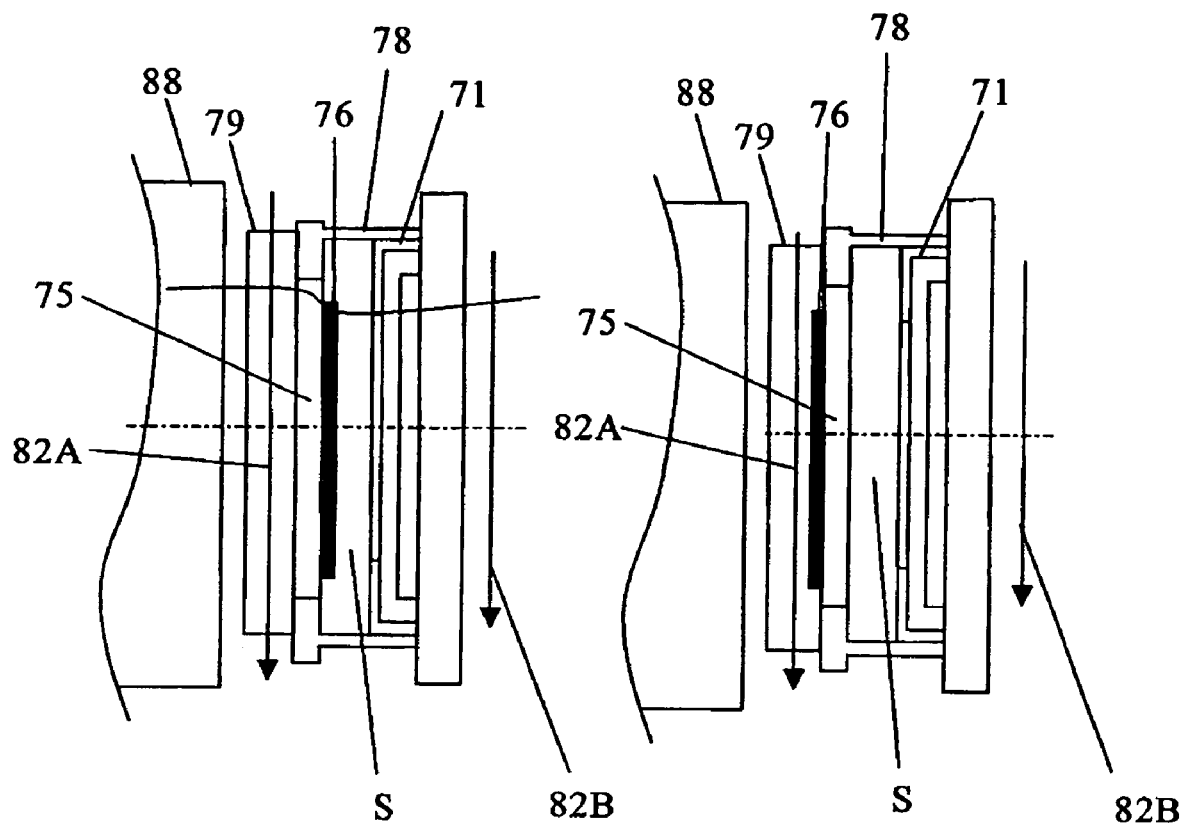
FIG. 3A is a diagram for explaining the cooling effect of the liquid crystal element unit of Embodiment 1.
FIG. 3B is a diagram for explaining the cooling effect of a modification of Embodiment 1.

FIGS. 1, 2, and 3A show a liquid crystal element unit serving as an optical modulation element unit which is Embodiment 1 of the present invention. As shown in FIG. 3A, the liquid crystal element unit is disposed with a predetermined interval (a path of cooling wind that is an air flow) between itself and an entrance/emergence surface of a polarization beam splitter 88 which performs color separation and color combination when the unit is mounted on a projection optical unit, later described.

The liquid crystal element unit has a reflective liquid crystal panel 61B serving as a reflective optical modulation unit (a reflective liquid crystal element) and a back plate 70 to which the reflective liquid crystal panel 61B is attached. A light-shield mask 71 made of sheet metal such as stainless steel and aluminum is attached to the back plate 70 to cover the front of the reflective liquid crystal panel 61B (the surface through which light enters and emerges). A shift register is wired to the ends of pixels constituting a display portion of the reflective liquid crystal panel 61B to control the respective pixels. The mask member 71 for hiding the image of the shift register is provided near the liquid crystal panel 61B to prevent the shift register from being projected as a pattern onto a projected image.

The liquid crystal element unit has a film-type quarter-wave plate (a phase plate) 76 serving as a film-type optical function member disposed in front of the mask member 71. The quarter-wave plate 76 is adhered to a light-transmissive or transparent substrate 75 to ensure the planarity of the quarter-wave plate 76. The transparent substrate 75 is held by a holder (holding member) 79 which constitutes a dustproof holding frame 73 fixed to the back plate 70 to position the quarter-wave plate 76 with a predetermined interval between the quarter-wave plate 76 and the reflective liquid crystal panel 61B. The dustproof holding frame 73 is constituted by the holder 79 and a cover 78A which is disposed between the holder 79 and the back plate 70.

The display surface (the surface through which light enters and emerges) of the reflective liquid crystal panel 61B is covered with a thin cover glass 61C for protecting the display surface from external force and for preventing direct sticking of dust to the display surface. The cover glass 61C is originally included in the liquid crystal panel 61B as a component thereof.

When a projection lens, later described, is focused on the display surface, a sufficient defocusing amount may not be provided for dust stuck to the surface of the thin cover glass 61C. In general, a reflective liquid crystal panel of the vertical orientation type includes almost nothing which blocks light between adjacent pixels, so that it is difficult to form a support structure such as a pole extending in the direction of the normal to the panel display surface between pixels. Even though such a support structure is provided, it may cause degradation in image quality such as contrast. Since an increase in thickness of the cover glass 61C applies additional stress to the liquid crystal panel 61B, it is also difficult to use a technique for ensuring a sufficient defocusing amount by increasing the thickness of the cover glass 61C.

Thus, it is preferable that another cover glass is provided at a position several millimeters away from the panel display surface and the mask surface of the mask member 71, and the space between that cover glass and the liquid crystal panel is surrounded to provide a dustproof effect with a sufficient defocusing amount.

When the new cover glass is provided, however, it is necessary to have a space for placing the new cover glass between the quarter-wave plate 76 or the liquid crystal panel 61B and the polarization beam splitter from which light is directed to them and to which light is directed from them. This increases the length of the back focus from the projection lens which projects the image formed by the reflective liquid crystal panel, thereby increasing the size of the overall optical system.

To address this, in Embodiment 1, the transparent substrate 75 for holding the quarter-wave plate 76 disposed near the liquid crystal panel 61B is used as the cover glass (the dustproof glass) for preventing any dust from sticking to the liquid crystal panel 61B. A space S between the transparent substrate 75 and the liquid crystal panel 61B is surrounded by the dustproof holding frame 73 made of resin to close the opening between the transparent substrate 75 and the liquid crystal panel 61B. This can realize the dustproof structure for the liquid crystal panel 61B which ensures a sufficient defocusing amount for dust adhered to the cover glass and prevents an increased length of the back focus from the projection lens. Since the dustproof holding frame 73 is the only member necessary for the dustproof purpose other than optically required parts, an increase in the number of parts can be minimized. The dustproof holding frame 73 also serves as a member for holding the transparent substrate 75.

In Embodiment 1, the dustproof holding frame 73 is actually disposed between the transparent substrate 75 and the back plate 70 in contact with the back of the liquid crystal panel 61B to surround the space S between the transparent substrate 75 and the liquid crystal panel 61B. In this manner, "to surround the space between the transparent substrate and the liquid crystal panel" includes not only surrounding only the space between the substrate and the panel but also surrounding the space to a member (or members) in contact with the front or back of the substrate or the panel.

As shown in FIG. 3A, however, the dustproof holding frame 73 of Embodiment 1 is formed not to surround the space between the transparent substrate 75 and the polarization beam splitter 88, the space being along (facing) the surface of the substrate 75 on the side opposite to the liquid crystal panel 61B. In other words, the transparent substrate 75 forms one end of the space surrounded by the dustproof holding frame 73. This can ensure the path of cooling wind between the transparent substrate 75 and the entrance/emergence surface of the polarization beam splitter 88.

In Embodiment 1, the quarter-wave plate 76 and the transparent substrate 75 are supported by the holder 79. The holder 79 has walls on the side closer to the polarization beam splitter 88 and on both sides of the path of cooling wind to guide the cooling wind. The holder 79 for supporting the transparent substrate 75 is provided with a duct 80 for guiding the cooling wind at an accelerating speed to near the quarter-wave plate 76 and the transparent substrate 75 to collect the cooling wind to the central areas thereof. The walls of the holder 79 and the duct 80 are included as a guide portion for guiding the cooling wind to allow efficient cooling of the transparent substrate 75 and the quarter-wave plate 76. The holder 79 and the duct 80 in Embodiment 1 may be molded in one piece or may be individually formed and then bonded together with screws or adhesion. When the holder 79 and the duct 80 are made of resin for molding or the like and molded in one piece, the manufacturing process can be simplified. When the holder 79 and the duct 80 are individually formed and then bonded together, the respective members are easily molded and the materials can be selected as appropriate. For example, the duct 80 may be molded with a resin material and the holding member may be molded with a metal material to improve radiation efficiency in the transparent substrate 75 by using the relatively high heat conductivity of the metal material.

In addition, Embodiment 1 employs the following structure for realizing a projector which enables projection of a brighter image than in conventional projectors (hereinafter referred to as a "bright projector").

First, the back plate 70 made of aluminum, an alloy of iron and nickel or the like is attached to the back of the liquid crystal panel 61B. The realization of the bright projector requires efficient conduction of heat produced in the liquid crystal panel 61B to the back plate 70 and efficient radiation of the heat conducted to the back plate 70. Thus, the back plate 70 has radiating fins 70B as shown in FIG. 2. Alternatively, radiating fins made of aluminum may be attached to the back plate made of an alloy of iron and nickel by an adhesive with high heat conductivity, for example. This enables the heat to be radiated sufficiently on the back side of the liquid crystal panel 61B when the dustproof space S on the display surface side thereof is covered with and substantially sealed with the dustproof holding frame 73, so that the liquid crystal panel 61B can receive a large amount of light to realize the bright projector.

In addition, in the projection optical unit which employs the liquid crystal element unit of Embodiment 1, the F-number of an illumination optical system can be set to a lower value than in conventional systems. In FIG. 1, an incident angle 72 of light entering the quarter-wave plate 76 is larger than that in conventional liquid crystal projectors. Since the quarter-wave plate of crystal used in the conventional reflective liquid crystal projector generally has a poorer viewing angle characteristic than the one of film type, the contrast is low even when the illumination optical system with a low F-number is used. The use of the film-type quarter-wave plate is essential to realize the bright projector.

On the other hand, since the quarter-wave plate made of organic film has an allowable temperature limit lower than that of one made of crystal, the quarter-wave plate 76 needs to be cooled. In Embodiment 1, as shown in FIGS. 1 and 3A, the transparent substrate 75 to which the quarter-wave plate 76 is attached is disposed such that the quarter-wave plate 76 faces the liquid crystal panel, and the surface (outer surface) of the transparent substrate 75 opposite to the surface to which the quarter-wave plate 76 is attached is exposed to the outside of the dustproof space S surrounded by the abovementioned dustproof holding frame 73. Cooling wind 82A guided by the walls of the holder 79 is applied to the outer surface of the transparent substrate 75 (see FIG. 3A) to efficiently radiate the heat produced in the quarter-wave plate 76 through the transparent substrate 75.

The thickness of the transparent substrate 75 in this case is substantially the same as that of the quarter-wave plate of crystal, and thus the necessary space for placement is equal to that when the quarter-wave plate of crystal is used.

Next, the cooling effect of the case shown in FIG. 3A will be described. The dustproof space S on the display surface side of the liquid crystal panel 61B is the substantially sealed space surrounded by the transparent substrate 75, the dustproof holding frame 73, and the back plate 70. The air in the sealed space has a heat conductivity of 0.02 W/mK and acts substantially as a heat insulator when it is not circulated in the sealed space. On the other hand, the film-type quarter-wave plate 76 has a heat conductivity of 0.1 to 0.3 W/mK. The glass plate used for the transparent substrate 75 in Embodiment 1 has a heat conductivity of approximately 1.1 W/mK.

In this case, the transparent substrate (glass plate) 75 has a higher heat conductivity than the quarter-wave plate 76, and the amount of heat diffused in the transparent substrate 75 is larger than that diffused in the quarter-wave plate 76.

In other words, the heat conductivities of the air in the sealed space and the glass plate are approximately 10 times lower and approximately 10 times higher than the film, respectively. Thus, in FIG. 3A, most of the heat produced in the quarter-wave plate (film) 76 is conducted to the transparent substrate (glass plate) 75 and diffused through heat conduction in the transparent substrate 75. The surface of the transparent substrate 75 is cooled by the cooling wind 82A to result in efficient cooling of the quarter-wave plate 76. It is preferable to select a material having a heat conductivity of 0.9 W/mK or higher for the transparent substrate 75.

The transparent substrate 75 may be made of a material having a heat conductivity higher than that of the glass (for example, 1.5 W/mK). For example, sapphire (42 W/mK) may be used. However, when the sapphire is used, the crystallographic axis should be considered. The heat radiation can be easily improved by using fluorite (9.71 W/mK) or silica glass (1.6 W/mK) which is originally optically isometric or amorphous with no anisotropy and has a heat conductivity higher than that of the glass.

As shown in FIG. 3B, the transparent substrate 75 to which the quarter-wave plate 76 is attached may be disposed such that the quarter-wave plate 76 faces the side opposite to the liquid crystal panel to expose the quarter-wave plate 76 to the outside of the dustproof space S surrounded by the abovementioned dustproof holding frame 73. In this case, the cooling wind 82A can be applied directly to the quarter-wave plate 76 to cool the quarter-wave plate 76.

As described above, however, the heat conductivity of the film is lower than that of the glass plate, and the amount of heat diffused in the quarter-wave plate 76 is smaller than that diffused in the transparent substrate 75. Since the area of the transparent substrate 75 exposed to the outside of the sealed space is smaller than the case in FIG. 3A, the heat easily stays within the transparent substrate 75 to produce a temperature gradient between the central area (the central portion of the area which light enters) of the transparent substrate 75 and the peripheral area. If the temperature gradient is present at a certain point, the thermal stress is produced at that point to cause birefringence which may lead to leakage of light (in other words, uneven brightness or color in a projected image). Thus, when the structure as shown in FIG. 3B is used, it is necessary to achieve more sufficient cooling with the cooling wind to avoid such disadvantages.

The transparent substrate 75 in the structure in FIG. 3B is preferably made of a material having a low photoelastic constant. In general, the glass has a photoelastic constant of approximately 1.1 nm/cm/$10^5$ Pa. Preferable glasses include, for example, PBH55 glass made by OHARA INC. (a photoelastic constant of 0.03 nm/cm/$10^5$ Pa), and SF6 glass made by SCHOTT Nippon K.K. (a photoelastic constant of 0.065 nm/cm/$10^5$ Pa) which have low photoelastic constants. The transparent substrate in the structure in FIG. 3A may be formed, for example, of N-SF6 glass having a heat conductivity substantially equal to that of the glass and a photoelastic constant lower than 1 nm/cm/$10^5$ Pa (a heat conductivity of 0.96 W/mK and a photoelastic constant of 0.28 nm/cm/$10^5$ Pa). Such a material can reduce the amount of light leakage due to the birefringence. The intended use of a material having a photoelastic constant of 1.0 nm/cm/$10^5$ Pa or lower can further improve the contrast and image quality.

In each of the cases in FIGS. 3A and 3B, cooling wind 82B can be flowed between the radiating fins 70B provided for the back plate 70 to efficiently cool the liquid crystal panel 61B. This can cool the quarter-wave plate 76 and the liquid crystal panel 61B without increasing the number of fans.

Embodiment 2

Figure 4:
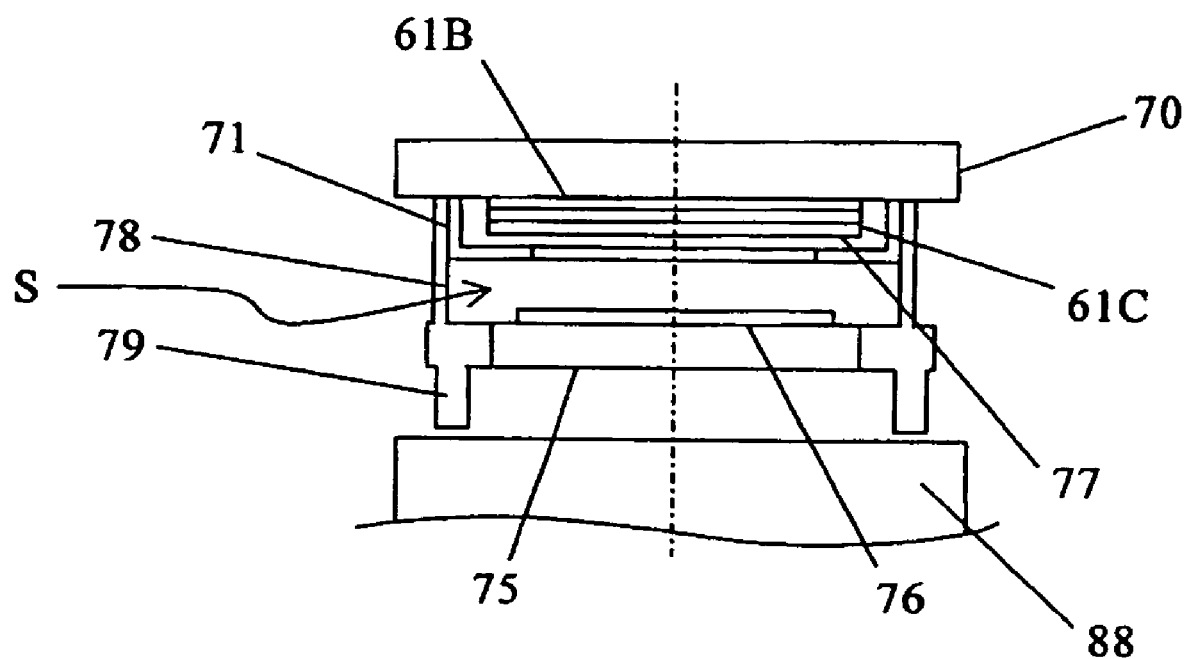
FIG. 4 is a section view of a liquid crystal element unit which is Embodiment 2 of the present invention.

FIG. 4 shows a liquid crystal element unit which is Embodiment 2 of the present invention. When the liquid crystal element unit is formed as in Embodiment 1, dust may remain attached to the liquid crystal panel 61B in assembly. Thus, in Embodiment 2, a defocus plate 77 serving as a light-transmissive cover plate is attached onto a cover glass 61C originally provided for a liquid crystal panel 61B prior to the assembly of the liquid crystal element unit. A projection lens is focused on the display surface of the liquid crystal panel 61B and is not focused on dust which is attached to the defocus plate 77 during the assembly of the liquid crystal element unit with the defocusing amount corresponding to the thickness of the defocus plate 77, which makes the dust inconspicuous in a projected image.

Since the defocus plate 77 is attached to the cover glass 61C, the defocus plate 77 can be added with almost no change in thickness of the liquid crystal element unit in the optical path direction (the length from a transparent substrate 75 to a back plate 70) as compared with Embodiment 1.

In Embodiment 2, since the defocus plate 77 is disposed in a sealed space as the dustproof space S, the temperature of the defocus plate 77 may be increased to produce light leakage due to birefringence. To avoid this, the defocus plate 77 is preferably made of a material having a photoelastic constant of 1.0 nm/cm/$10^5$ Pa or lower, for example the abovementioned SF6 glass or PBH55 glass, as described in Embodiment 1.

Embodiment 3

Embodiments 1 and 2 have been described in conjunction with the case where the quarter-wave plate 76 (the transparent substrate 75) is not rotated with respect to the liquid crystal panel 61B. It is preferable that the quarter-water plate 76 can be rotated to adjust its position about the axis (the optical axis of illumination light) which passes through the central area of the quarter-wave plate 76 for the purpose of improving the contrast of a projected image.

Figures 5A, 5B:
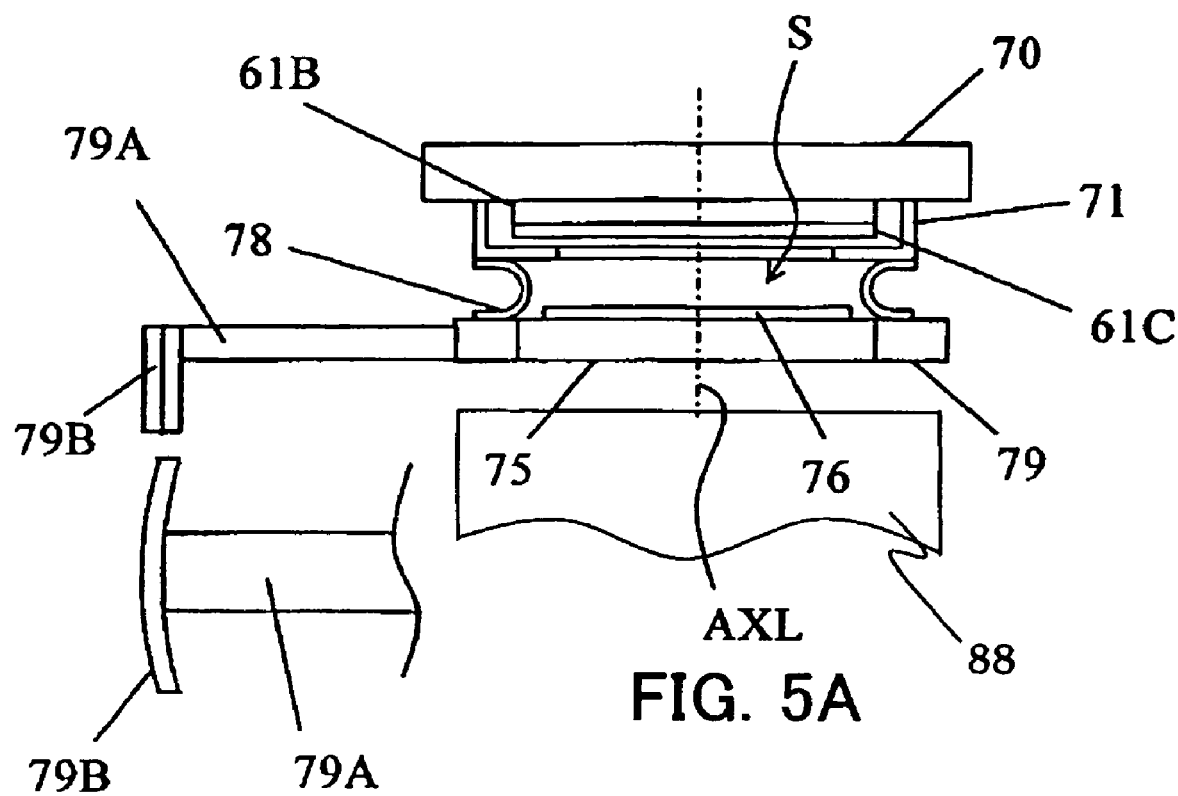
FIG. 5A is a section view of a liquid crystal element unit which is Embodiment 3 of the present invention.
FIG. 5B is a front view partially showing the liquid crystal element unit of Embodiment 3.

FIGS. 5A and 5B show a liquid crystal element unit which is Embodiment 3 of the present invention. As shown in FIGS. 5A and 5B, in Embodiment 3, a quarter-wave plate 76 and a transparent substrate 75 are supported by a holder (a holding member) 79 which is rotatable around the abovementioned axis AXL. The holder 79 has an extension 79A which extends in the direction away from the axis AXL. The extension 79A has, at its end, a portion 79B in arc shape with its center at the axis AXL when viewed from the axis AXL as shown in FIG. 5B. The holder 79 can be held rotatably around the axis AXL in a member for rotatably supporting the holder 79 (for example, a base member for supporting the respective optical elements in a projection optical unit) by providing a portion in arc shape with its center at the axis AXL on that member.

In this case, an elastic dustproof cover made of an elastic member such as rubber is provided between the holder 79 and a back plate 70 to surround the space between the transparent substrate 75 and a liquid crystal panel 61B (a cover glass 61C in Embodiment 3) to realize the dustproof structure for the liquid crystal panel 61B by the transparent substrate 75 serving as the dustproof glass and the elastic dustproof cover.

In Embodiment 3, the elastic dustproof cover 78 is disposed between the holder 79 and the mask member 71 and is formed to have a generally U-shaped cross section. When the holder 79 is rotated, the holder 79 is slid against the elastic dustproof cover 78. The elastic dustproof cover 78 is charged (biased) in the axis direction to prevent the elastic dustproof cover 78 from being displaced due to the sliding against the holder 79 to cause dust to enter the dustproof space S.

The mask member 71 has the opening sized to hide the shift register as described above, so that part of the member 71 lies on the outer periphery of effective luminous flux. Thus, the end face of the mask member 71 may absorb a slight amount of light. The heat produced at the end of the mask member 71 is conducted over the entire mask member 71 and then radiated through the back plate 70. The elastic dustproof cover 78 preferably has heat resistance since it is in contact with the mask member 71 and the back plate 70. The panel atmosphere temperature is typically 40 to 60 degrees, and thus heat resistance to a temperature higher than that is required. Specifically, the elastic dustproof cover 78 may be made of EPDM rubber of a heat resistant type or silicon rubber, or a thermoplastic resin such as elastomer.

Embodiment 4

In the quarter-wave plate 76 and the liquid crystal panel 61B, the largest amount of light is incident on their central areas corresponding to near the center of the screen (the optical axis center), and the central areas need to be particularly cooled. In the bright projector, for example, blowing wind from a fan is used to collect the cooling wind to the central areas with an increased wind speed to effectively increase the cooling efficiency. To this end, it is important to extend the duct to near the quarter-wave plate 76 and the liquid crystal panel 61B, which produce heat, to increase gradually the wind speed without causing pressure loss. Since the transparent substrate 75 and the polarization beam splitter 88 form part of the wind path, a change in the interval between them can vary the shape of the wind path to change the speed of the flowing wind. This also changes the ability to cool the quarter-wave plate 76 per unit time.

Figure 6:
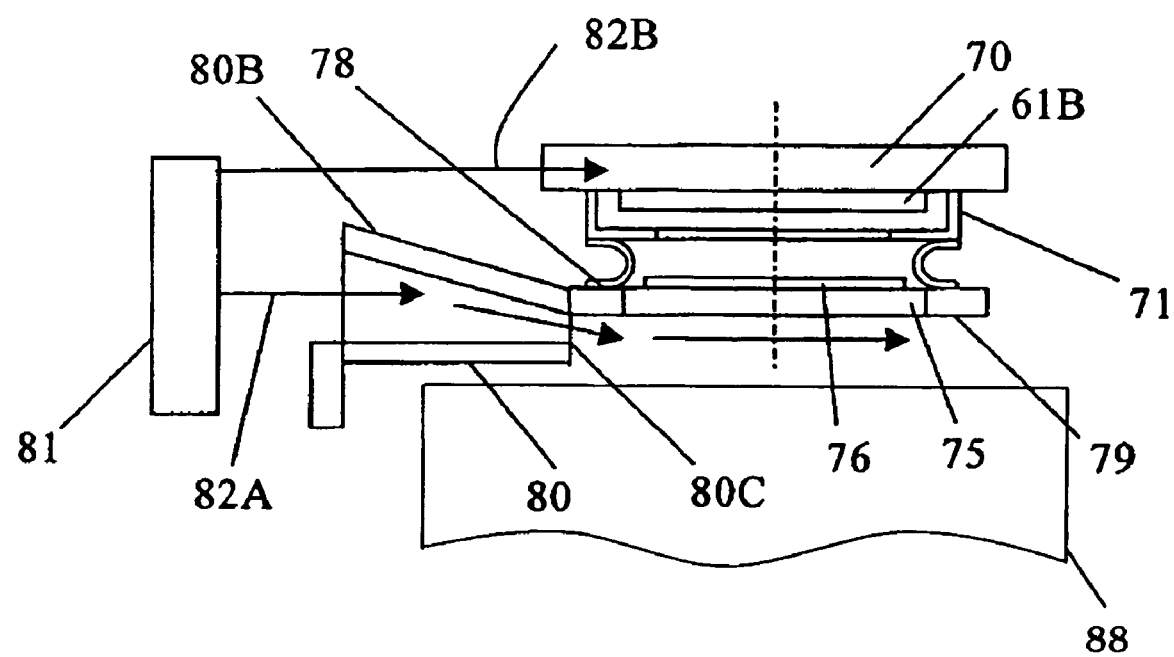
FIG. 6 is a section view of a liquid crystal element unit which is Embodiment 4 of the present invention.
Figure 7:
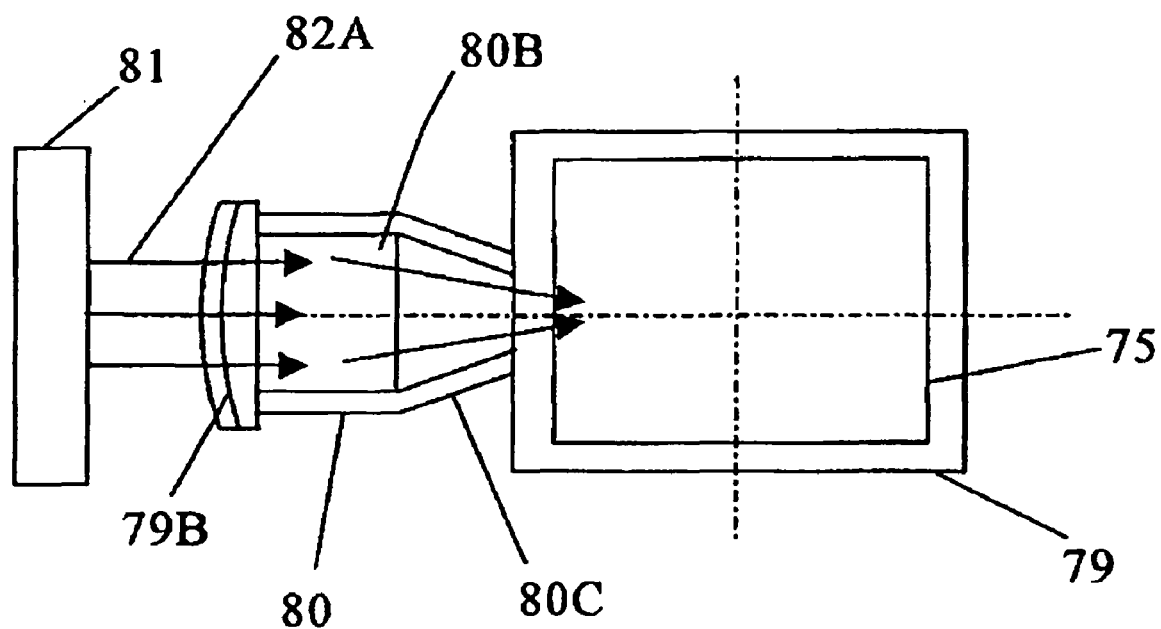
FIG. 7 is a front view of the liquid crystal element unit of Embodiment 4.

FIGS. 6 and 7 show a liquid crystal element unit which is Embodiment 4 of the present invention. In Embodiment 4, a duct 80 is provided for a holder 79 for holding a transparent substrate 75 to guide cooling wind with a gradually increased speed to near a quarter-wave plate 76 and the transparent substrate 75 to collect the cooling wind to their central areas.

In general, an image projection apparatus has ducts for guiding cooling wind from a limited number of fans to respective portions in the image projection apparatus. The cooling wind is also guided to the liquid crystal element unit. Reference numeral 81 shows a blowoff port of the cooling wind from the fan.

As shown in FIG. 6, the duct 80 provided on the holder 79 has an inclined portion 80B for guiding a part 82A of the cooling wind from the blowoff port 81 to the outer surface of the transparent substrate 75. This can prevent a flow of the part 82A of the cooling wind from the blowoff port 81 toward an elastic dustproof cover 78 and a mask member 71 to collect the cooing wind to the outer surface of the transparent substrate 75. Although not shown, another duct may be provided for guiding a part 82B of the cooling wind from the blowoff port 81 toward radiating fins 70B (see FIG. 2) provided on a back plate 70.

As shown in FIG. 7, the duct 80 has a tapered portion 80C for collecting the cooling wind 82A toward the central area of the outer surface of the transparent substrate 75. This can efficiently direct the cooling wind to the central area of the transparent substrate 75.

Figure 8:
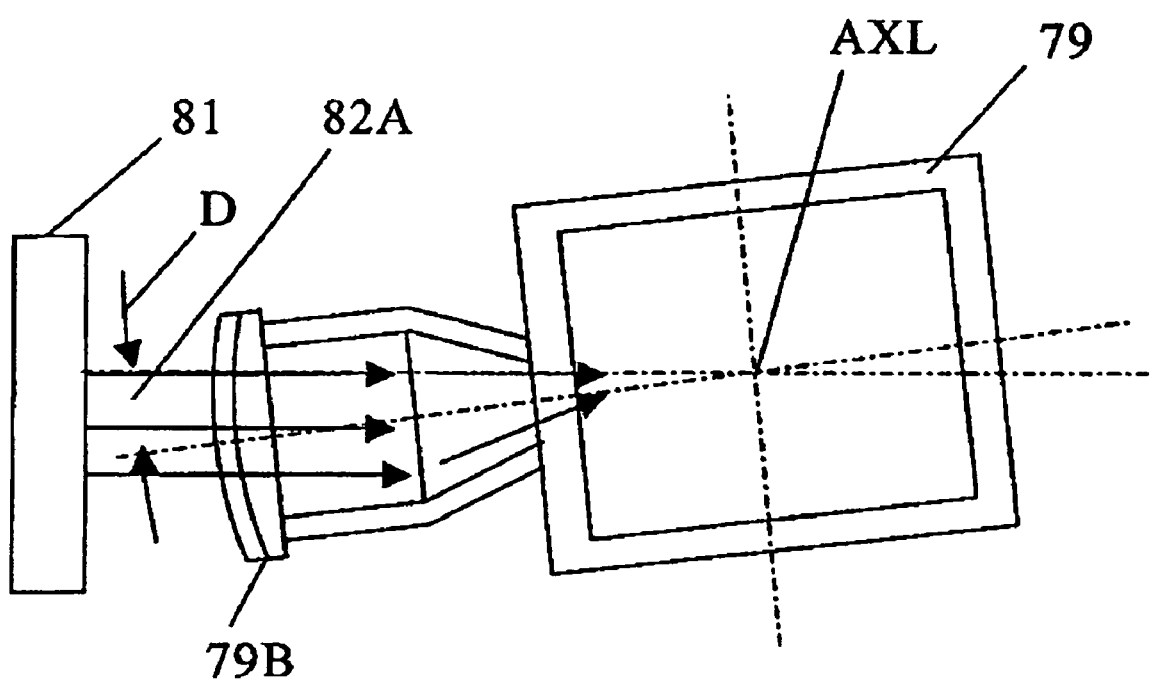
FIG. 8 is a front view of the liquid crystal element unit of Embodiment 4 with a transparent substrate and a quarter-wave plate rotated.

When the holder 79 is rotatable around the axis AXL (having an arc 79B) similarly to Embodiment 3, the duct 80 can be formed rotatably together with the holder 79 as shown in FIG. 8 such that the outlet port of the tapered portion 80C of the duct 80 faces the central area at all times to guide the cooling wind 82A to the central area.

In this case, the holder 79 is rotated to cause a displacement D of the center of the intake port of the duct 80 with respect to the blowoff port 81. The blowoff port 81 or the intake port of the duct 80 can be formed in a sufficiently large size to allow for the maximum value of the displacement D, thereby flowing a generally constant amount of the cooling wind into the duct 80 to reduce variations in cooling effect of the quarter-wave plate 76 and the transparent substrate 75 associated with adjustment of the rotation position.

Embodiment 5

Figures 9A, 9B:
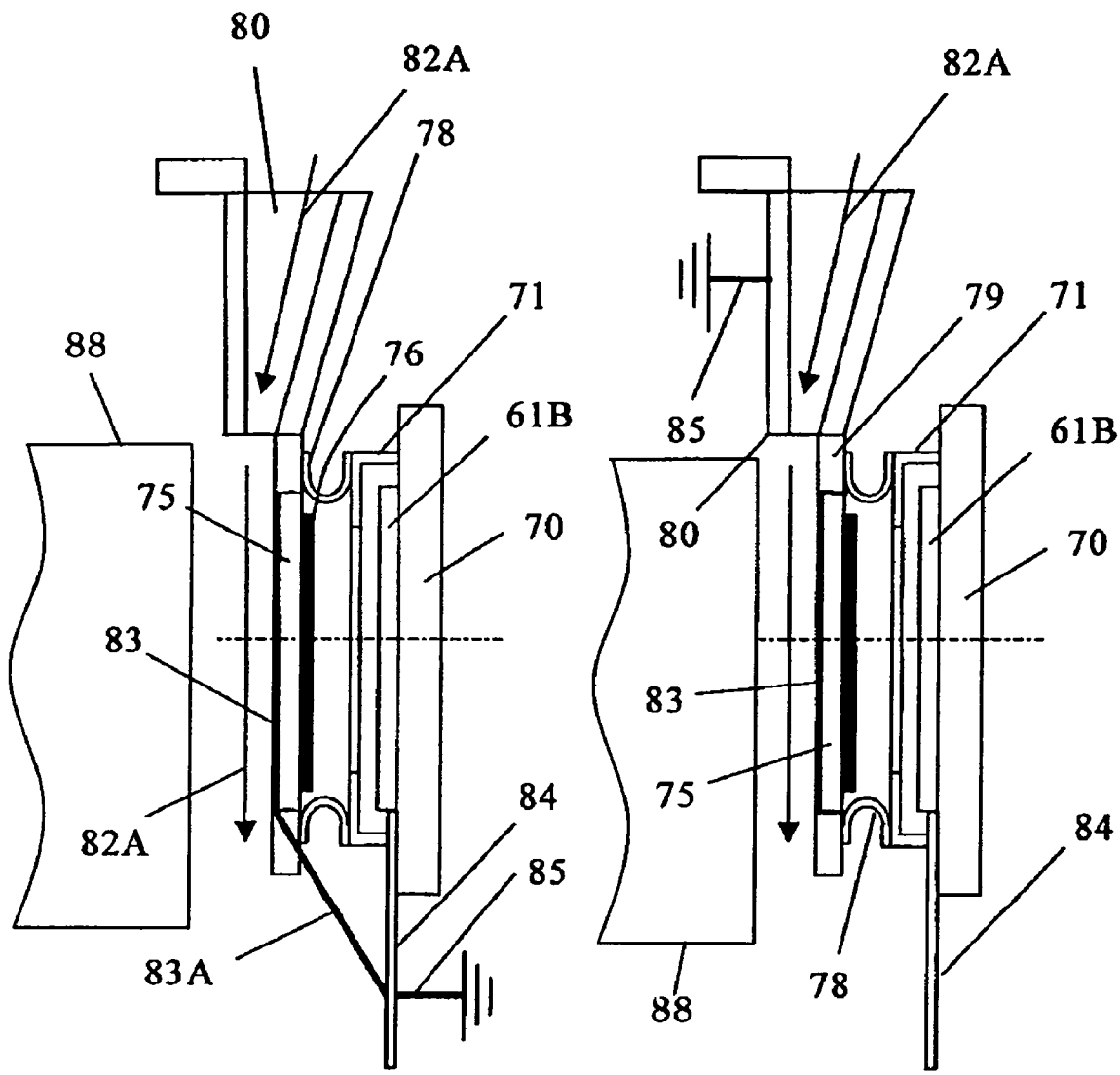
FIG. 9A is a section view of a liquid crystal element unit which is Embodiment 5 of the present invention.
FIG. 9B is a section view of a modification of the liquid crystal element unit of Embodiment 5.

FIG. 9A shows a liquid crystal element unit which is Embodiment 5 of the present invention. In Embodiment 5, cooling wind 82A from a duct 80 cools a transparent substrate 75 to which a quarter-wave plate 76 is attached. The resulting image quality can be further increased by preventing dust in the cooling wind 82A from being easily attached to the outer surface of the transparent substrate 75.

In Embodiment 5, as shown in FIG. 9A, a transparent electrode film 83 is evaporated onto the outer surface of the transparent substrate 75 to provide conductivity for the outer surface of the transparent substrate 75. The transparent electrode film 83 is connected via a conductive member 83A to a ground line 85 extended from a flexible substrate 84 connected to a liquid crystal panel 61B. The flexible substrate 84 is connected to an RGB circuit substrate 11 (later described and shown in FIG. 13) of an image projection apparatus and is grounded via the circuit substrate 11 (later described and shown in FIG. 13).

This structure eliminates electrostatic charge on the outer surface of the transparent substrate 75 to prevent dust included in the cooling wind 82A from being easily attached thereto.

Alternatively, as shown in FIG. 9B, it is possible that the holder 79 for holding the transparent substrate 75 is made of a conductive material, for example aluminum, with die casting, part of the holder 79 (the duct 80 in FIG. 9B) and the transparent electrode film 83 are brought into conduction, and the ground line 85 extended from the holder 79 is connected to the RGB circuit substrate of the image projection apparatus.

Embodiment 6

Figure 10:
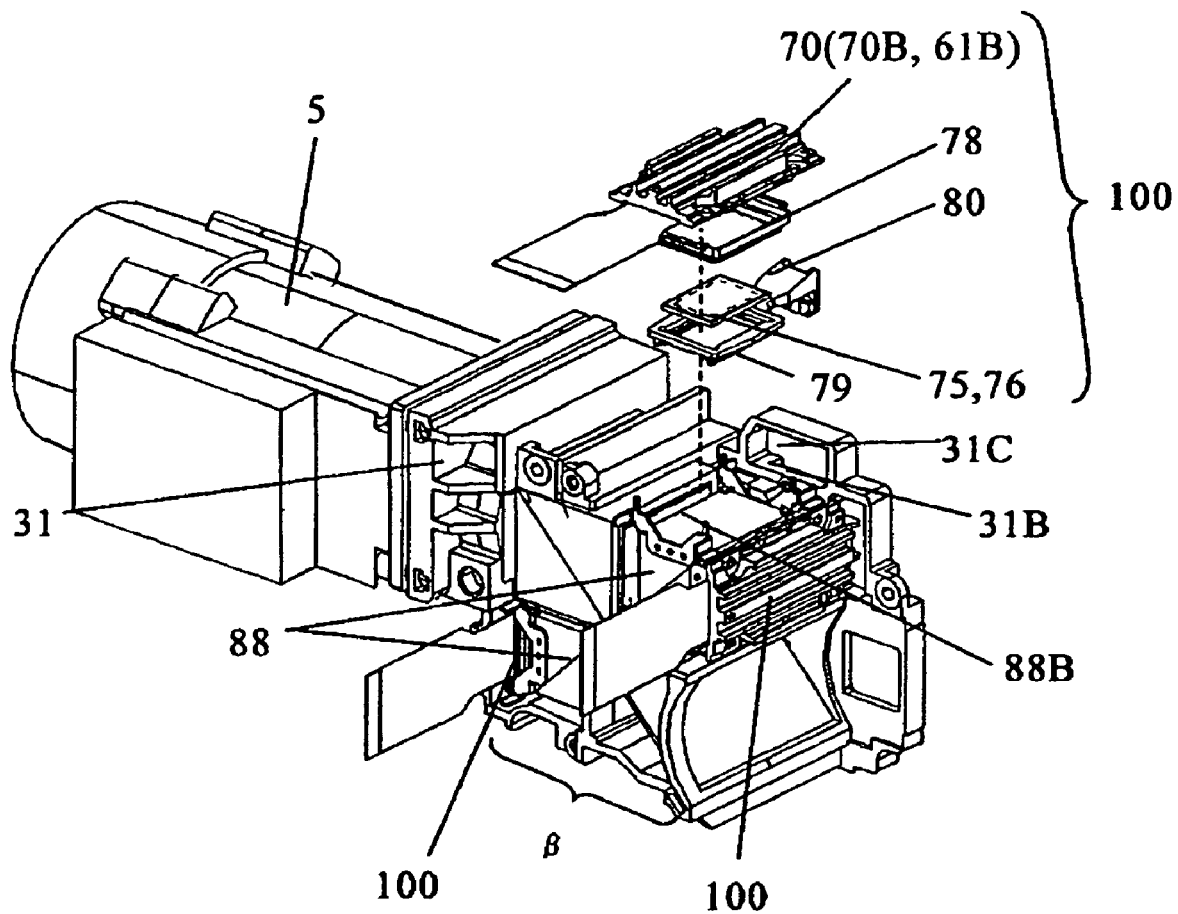
FIG. 10 is an exploded perspective view of a projection optical unit which is Embodiment 6 of the present invention.

FIG. 10 shows a projection optical unit which employs the liquid crystal element unit shown in any of Embodiments 4 and 5. The liquid crystal element unit in any of Embodiments 1 to 3 may be used instead of a liquid crystal element unit 100 shown in FIG. 10.

In FIG. 10, the components of the liquid crystal element unit shown in Embodiment 4 are designated with the same reference numerals as those in FIGS. 6 and 7, and the description thereof is omitted.

In FIG. 10, β shows an optical system which separates light from a light source, not shown, into light components for colors of R (red), G (green), and B (blue), guides them to three liquid crystal element units 100 provided for the respective colors, and combines the light components reflected and image-modulated by the liquid crystal element units 100 and guides them to a projection lens 5. Reference numeral 88 shows the polarization beam splitter included in the optical system β that is disposed with an interval as a path of cooling wind between itself and the transparent substrate 75 of the liquid crystal element unit 100. The detailed structure of the optical system β will be described in the following Embodiments.

The optical system β is held by a prism base 31. The liquid crystal panel 61B of each liquid crystal element unit 100 is adhered and fixed via the back plate 70 to a fixing hardware 88B fixed to the polarization beam splitter 88. The holder 79 for holding the transparent substrate 75 to which the quarter-wave plate 76 is attached is mounted such that its portion in arc shape (see 79B in FIG. 7) abuts on an arc-shaped slide portion 31B formed in the prism base 31 to allow rotation for adjustment around the optical axis. The prism base 31 has an opening 31C formed therein which is larger than the opening of the duct 80 provided on the holder 79 to guide the cooing wind to the liquid crystal element unit 100.

Embodiment 7

Figure 11:
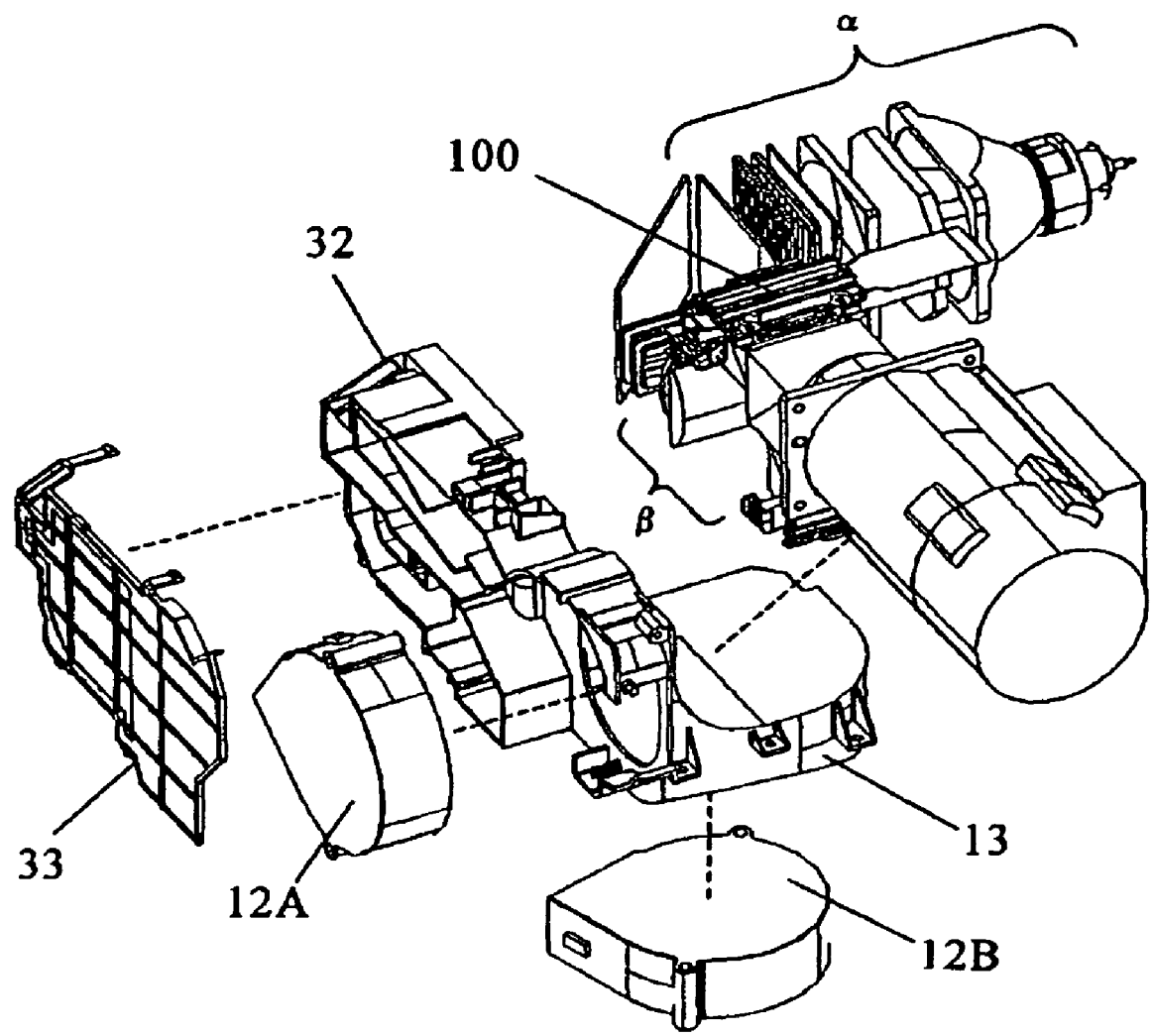
FIG. 11 is an exploded perspective view showing a projection optical unit and a cooling structure which are Embodiment 7 of the present invention.

FIG. 11 shows a cooling mechanism of the projection optical unit described in Embodiment 6. The cooling mechanism is provided around the projection optical unit in an image projection apparatus when the projection optical unit is set in the image projection apparatus. FIG. 11 shows an optical system a for guiding illumination light to the projection optical unit in addition to the projection optical unit which has the optical system β including the liquid crystal element unit 100. The prism base 31 is omitted in FIG. 11.

The cooling mechanism has main ducts 32 and 13 which guide cooling wind to the opening 31C formed in the prism base 31 shown in FIG. 10, and fans 12A and 12B which generate the cooling wind. The main ducts 32 and 13 are separately provided to guide the cooling wind substantially equally to the respective liquid crystal element units 100. The separated cooling wind is passed through the opening 31C and then blown to each liquid crystal element unit 100.

Figure 12:
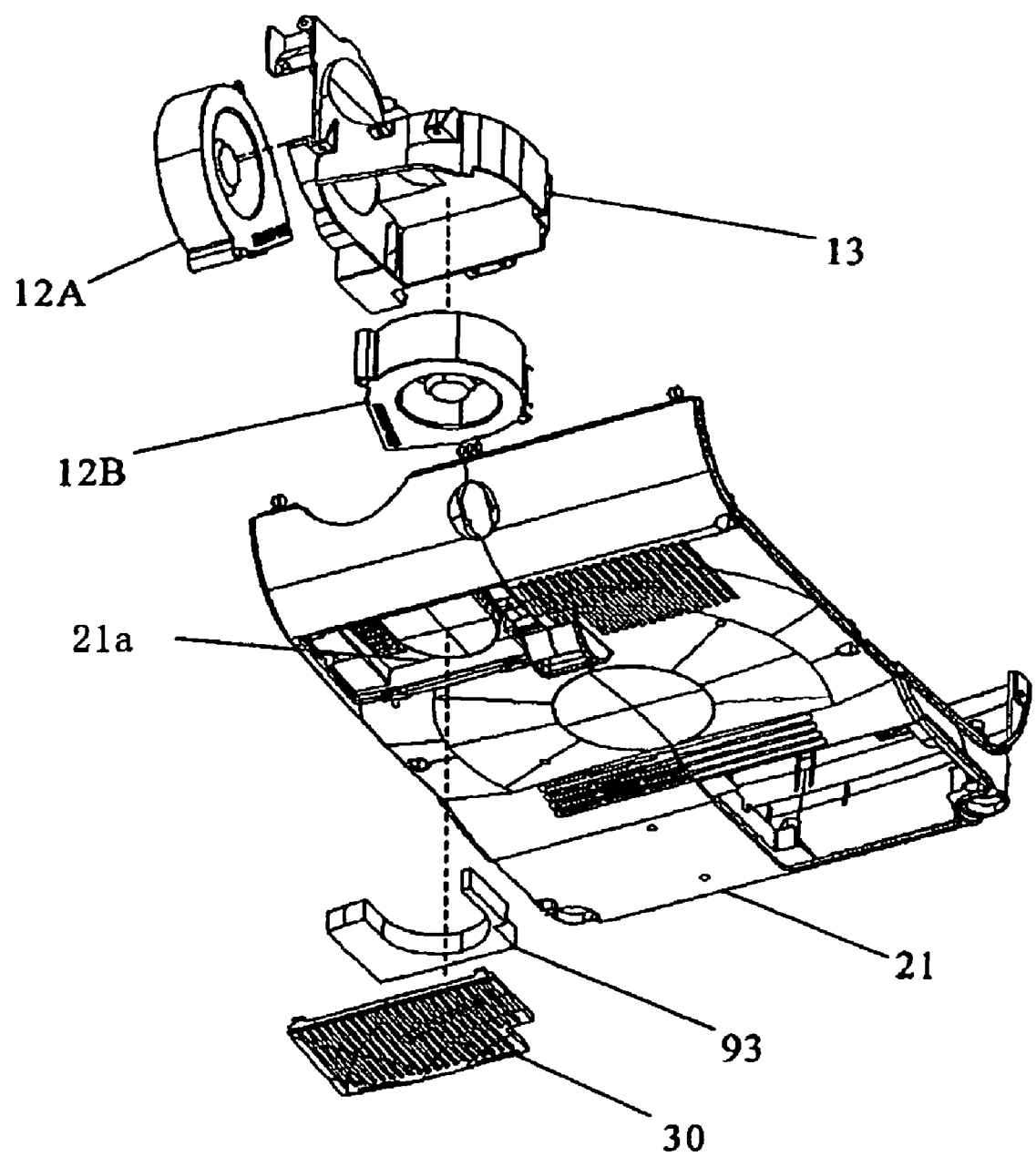
FIG. 12 is an exploded perspective view showing the cooling structure of Embodiment 7.

FIG. 12 shows the structure for allowing the fans 12A, 12B to take in air which is to serve as the cooling wind. The fans 12A and 12B are held by the main duct 13 attached to an outer exterior member (outer cabinet) 21 of the image projection apparatus so as to face an air intake port 21a formed in the outer cabinet 21. A filter 93 is put on the air intake port 21a and is held by a filter lid 30 attached to the air intake port 21a.

The filter 93 removes dust having a predetermined size or more from the air blown by the fans 12A and 12B through the air intake port 21a. Dust which cannot be removed by the filter 93 may reach the liquid crystal element unit 100 and be attached to the transparent substrate 75 serving as a dustproof glass. However, as shown in FIGS. 6 and 7, even when dust is attached to the transparent substrate 75 at a large distance from the liquid crystal panel 61B, a sufficient defocusing amount can be ensured for the dust.

Embodiment 8

Figure 13:
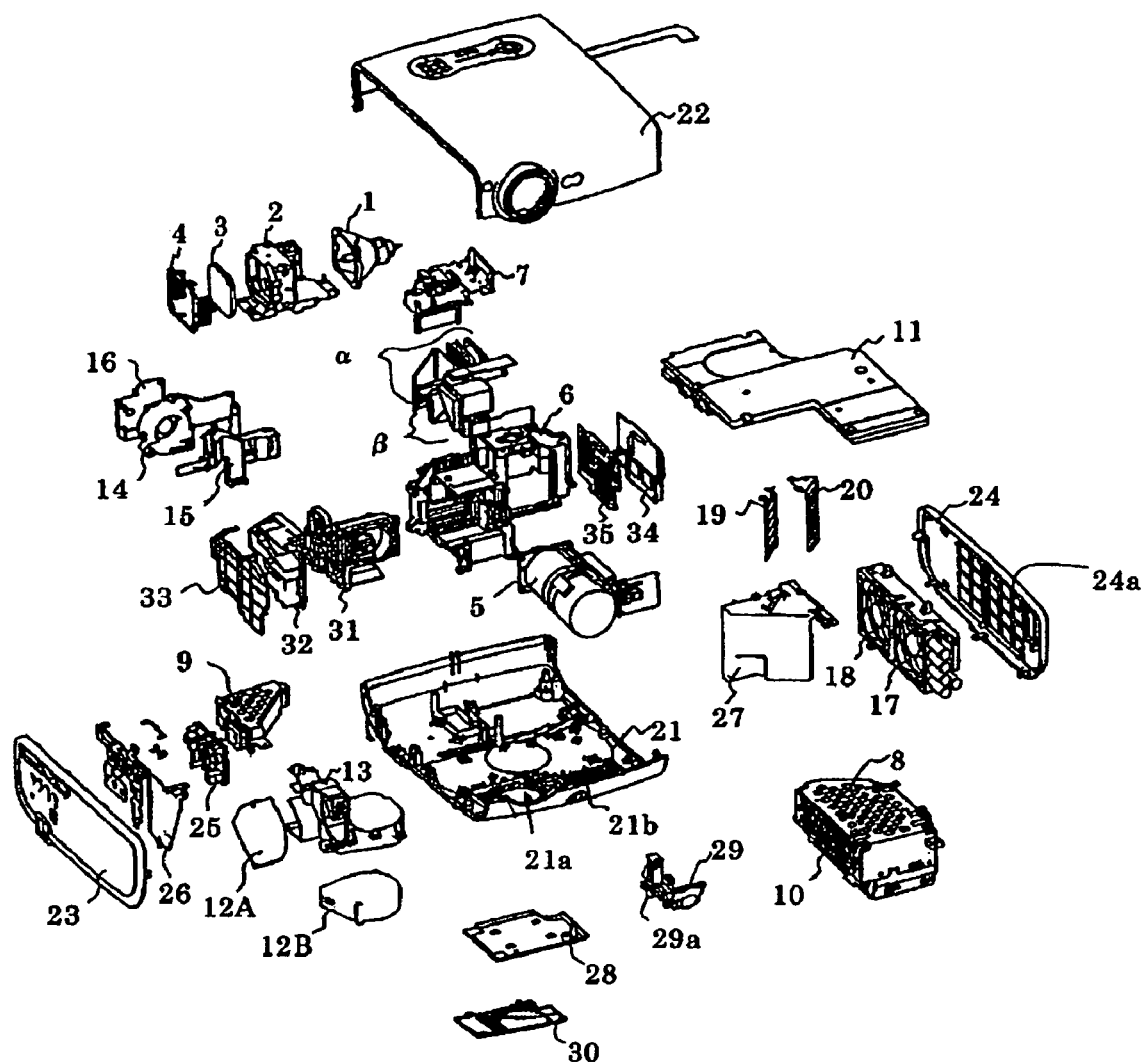
FIG. 13 is an exploded perspective view showing a liquid crystal projector which is Embodiment 8 of the present invention.

FIG. 13 is an exploded view showing a liquid crystal projector (an image projection apparatus) which employs the projection optical unit described in Embodiment 7. In FIG. 13, components identical to those shown in FIGS. 10 to 12 are designated with the same reference numerals.

In FIG. 13, reference numeral 1 shows a light source lamp, 2 a lamp holder for holding the lamp 1, 3 a dustproof glass, and 4 a glass holder. $\alpha$ shows an illumination optical system for guiding light from the lamp 1 to the color separation/combination optical system $\beta$. The color separation/combination optical system $\beta$ includes the liquid crystal element units for three colors of R, G, and B. Reference numeral 5 shows the projection lens for projecting light emerging from the color separation/combination optical system $\beta$ onto a screen (projection surface), not shown, to display an image. A projection lens optical system, not shown, is housed in the projection lens 5.

Reference numeral 6 shows an optical box which houses the lamp 1, the illumination optical system $\alpha$, and the color separation/combination optical system $\beta$, and to which the projection lens 5 is fixed. The optical box 6 has a lamp case member formed thereon as a lamp peripheral member for surrounding the lamp 1.

Reference numeral 7 shows an optical box lid for covering the optical box 6 which houses the illumination optical system $\alpha$ and the color separation/combination optical system $\beta$. Reference numeral 8 shows a power supply, 9 a power supply filter, and 10 a ballast power supply for lighting the lamp 1 together with the power supply 8. Reference numeral 11 shows a circuit substrate for driving the liquid crystal panel with power from the power supply 8 and outputting a command to light the lamp 1.

Reference numerals 12A and 12B show the optical system cooling fans for taking in air from an air intake port 21a of the outer cabinet 21 to cool the liquid crystal element unit and other optical elements in the color separation/combination optical system $\beta$ as described in Embodiment 7. Reference numeral 13 shows the optical system main duct A for guiding the cooling wind from the cooing fans 12A and 12B to the liquid crystal element unit and other optical elements in the color separation/combination optical system $\beta$.

Reference numeral 14 shows a cooling fan for the light source lamp for blowing the cooling wind to the lamp 1 to cool the lamp 1. Reference numeral 15 shows a lamp duct A for holding the lamp cooling fan 14 and guiding the cooling wind to the lamp 1, and 16 a lamp duct B for holding the cooling fan 14 and forming the duct together with the lamp duct A 15.

Reference numeral 17 shows a cooing fan for a power supply for taking in air from an air intake port 21b provided for the outer cabinet 21 to circulate the cooling wind within the power supply 8 and the ballast power supply 10 to cool them simultaneously. Reference numeral 18 shows an exhaust fan for discharging hot air at an increased temperature after the cooling wind from the lamp cooling fan 14 passes through the lamp 1.

Reference numeral 19 shows a lamp exhaust louver A, 20 a lamp exhaust louver B, both of which have a light shielding function to prevent leakage of light from the lamp 1 to the outside of the apparatus.

The outer cabinet 21 provides a lower portion of an outer case for housing the optical box 6 and the like. Reference numeral 22 shows an outer cabinet lid (an upper portion of the outer case) for covering the outer cabinet 21 which houses the optical box 6 and the like. Reference numeral 23 shows a side plate A, and 24 a side plate B. The outer cabinet 21 has the abovementioned air intake ports 21a and 21b formed therein, and the side plate B 24 has an air outlet port 24a formed therein.

Reference numeral 25 shows an interface substrate on which a connector is mounted for receiving various signals, and 26 an interface reinforcement plate attached to the inside of the side plate A 23.

Reference numeral 27 shows a lamp exhaust box for guiding exhaust heat from the lamp 1 to the exhaust fan 18 to prevent diffusion of the exhaust wind in the apparatus. The lamp exhaust box 27 holds the lamp exhaust louver A 19 and the lamp exhaust louver B 20.

Reference numeral 28 shows a lamp lid. The lamp lid 28 is removably provided on the bottom of the outer cabinet 21 and is fixed thereto by a screw, not shown. Reference numeral 29 show a set adjustment leg. The set adjustment leg 29 is fixed to the outer cabinet 21 with an adjustable height of a leg 29a. The adjustment of the height of the leg 29a enables adjustment of the inclination angle of the overall apparatus.

Reference numeral 30 shows the filter lid which holds the filter 93, shown in FIG. 12, attached to the outside of the air intake port 21a of the outer cabinet 21.

Reference numeral 31 shows the prism base for holding the color separation/combination optical system $\beta$, and 32 the main duct A which has a duct-shaped portion for guiding the cooling wind from the cooling fans 12A and 12B for cooling the optical element of the color separation/combination optical system $\beta$ and the reflective liquid crystal panel. Reference numeral 33 shows a main duct B which forms the duct together with the main duct A 32.

Reference numeral 34 shows an RGB substrate to which a flexible substrate extending from the reflective liquid crystal panel of the liquid crystal element unit disposed in the color separation/combination optical system $\beta$ is connected and which is connected to the circuit substrate 11. Reference numeral 35 shows an RGB substrate cover for preventing electric noise from entering the RGB substrate 34.

Next, description will be made of the entire optical system formed of the abovementioned lamp 1, illumination optical system $\alpha$, color separation/combination optical system $\beta$, and projection lens 5 with reference to FIGS. 14A and 14B.

Figure 14B:
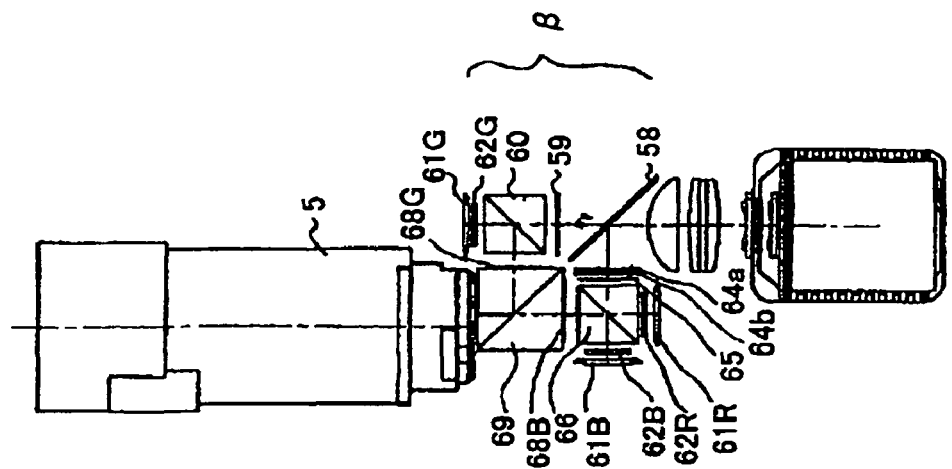
FIG. 14B is a plan view showing the structure of an optical system of the liquid crystal projector of Embodiment 8.
Figure 14A:
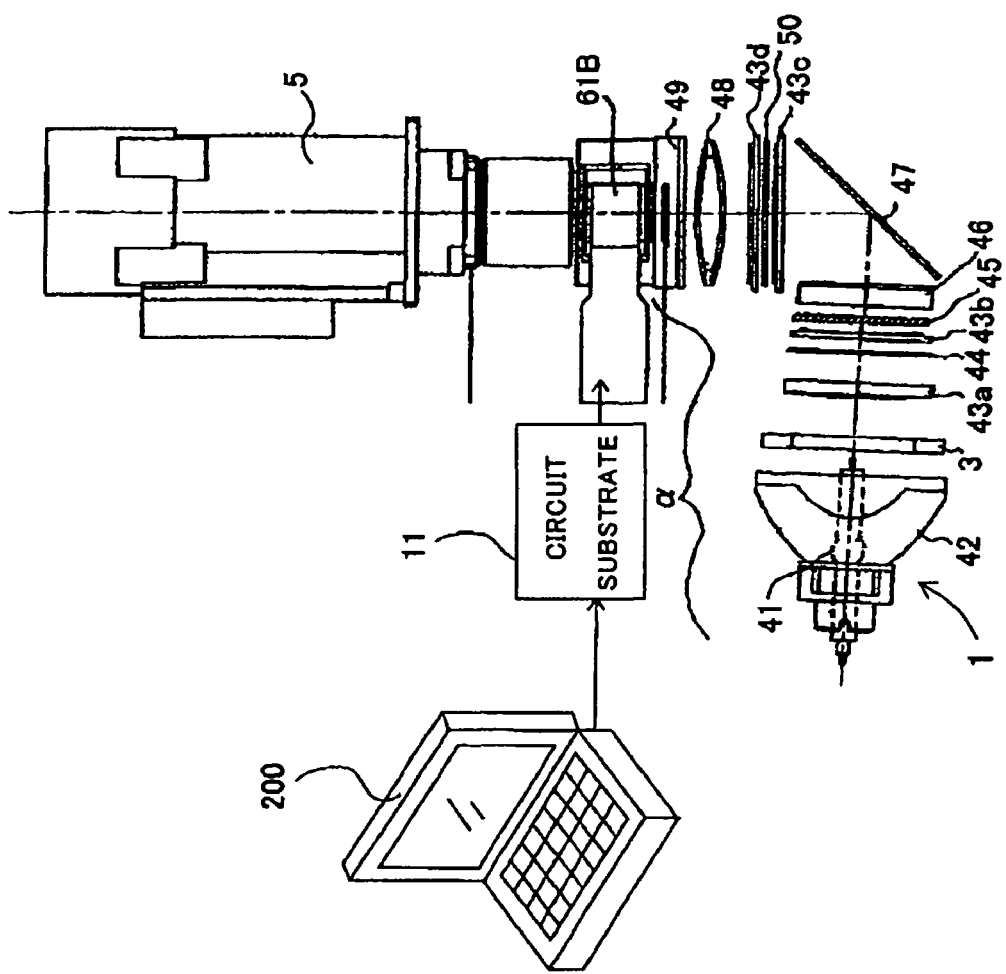
FIG. 14A is a side view showing the structure of an optical system of the liquid crystal projector of Embodiment 8.

In FIGS. 14A and 14B, reference numeral 41 shows an arc tube which emits white light in a continuous spectrum, and 42 a reflector which collects light from the arc tube 41 in a predetermined direction. The arc tube 41 and the reflector 42 constitute the lamp 1.

Reference numeral 43a shows a first cylinder array which is formed of an array of a plurality of lenses having a refractive power in a horizontal direction (a horizontal direction relative to the traveling direction of light from the lamp 1, the horizontal direction being a direction perpendicular to the sheet of FIG. 14A), 43b a second cylinder array which has an array of lenses corresponding to the respective lenses of the first cylinder array 43a, 44 an ultraviolet absorbing filter, and 45 a polarization conversion element which converts non-polarized light into predetermined polarized light.

Reference numeral 46 shows a front compressor which is formed of a cylindrical lens having a refractive power in a vertical direction (a vertical direction relative to the traveling direction of light from the lamp 1, the vertical direction being in parallel with the sheet of FIG. 14A), 47 a reflecting mirror which changes the optical axis by 88 degrees, 43c a third cylinder array which is formed of an array of lenses having a refractive power in the vertical direction, and 43d a fourth cylinder array which has an array of lenses corresponding to the respective lenses of the third cylinder array 43c.

Reference numeral 50 shows a color filter which returns color in a specific wavelength range to the lamp 1 for adjustment of color coordinates to predetermined values, 48 a condenser lens, and 49 a rear compressor which is formed of a cylindrical lens having a refractive power in the vertical direction. The abovementioned components constitute the illumination optical system α.

Reference numeral 58 shows a dichroic mirror which reflects light in the wavelength ranges of blue (B) and red (R) and transmits light in the wavelength range of green (G). Reference numeral 59 shows an incident-side polarizing plate which includes a polarizing element put on a transparent substrate and transmits only P-polarized light. Reference numeral 60 shows a first polarization beam splitter which transmits P-polarized light and reflects S-polarized light and has a polarization beam splitting surface.

Reference numerals 61R, 61G, and 61B-show a reflective liquid crystal panel for red, a reflective liquid crystal panel for green, and a reflective liquid crystal panel for blue, respectively, which reflect light incident thereon and image-modulate the incident light. These reflective liquid crystal panels 61R, 61G, and 61B receive a driving signal through the abovementioned circuit substrate 11 as shown in FIG. 14A. The circuit substrate 11 receives an image signal from an image supply apparatus 200 such as a personal computer, a DVD player, and a TV tuner.

Reference numerals 62R, 62G, and 62B show a quarter-wave plate for red, a quarter-wave plate for green, and a quarter-wave plate for blue, respectively. Reference numeral 64a shows a trimming filter which returns orange light to the lamp 1 for enhancing the color purity of red. Reference numeral 64b shows an incident-side polarizing plate for R and B which includes a polarizing element put on a transparent substrate and transmits only P-polarized light.

Reference numeral 65 shows a color-selective phase difference plate which converts the polarization direction of red light by 90 degrees and does not convert the polarization direction of blue light. Reference numeral 66 shows a second polarization beam splitter which transmits P-polarized light and reflects S-polarized light and has a polarization beam splitting surface.

Reference numeral 68B shows an emergence-side polarizing plate (a polarizing element) for B and regulates only the S-polarized light component of blue light. Reference numeral 68G shows an emergence-side polarizing plate for G which transmits only S-polarized light. Reference numeral 69 shows a dichroic prism which transmits red light and blue light, and reflects green light.

The abovementioned components from the dichroic mirror 58 to the dichroic prism 69 constitute the color separation/combination optical system β.

The definition of the P-polarized light and the S-polarized light in Embodiment 8 will be specified. The polarization conversion element 45 converts P-polarized light into S-polarized light. The P-polarized light and S-polarized light are described relative to the polarization conversion element 45. On the other hand, the light which enters the dichroic mirror 58 is considered relative to the polarization beam splitters 60 and 66, and is regarded as P-polarized light. While the light emerging from the polarization conversion element 45 is S-polarized light, this is defined as P-polarized light when it enters the dichroic mirror 58.

Next, the optical effects will be described. The light emitting from the arc tube 41 is then collected in a predetermined direction by the reflector 42. The reflector 42 has a paraboloidal shape, and the light from the focal point of the paraboloidal surface is directed as luminous flux in parallel with the axis of symmetry of the paraboloidal surface. However, since the source of the light from the arc tube 41 is not an ideal point source of light and has a finite size, the collected luminous flux contains a large amount of light component not in parallel with the axis of symmetry of the paraboloidal surface. The luminous flux enters the first cylinder array 43a. The luminous flux entering the first cylinder array 43a is then split into a plurality of luminous fluxes through the respective cylinder lenses and collected thereby to form a plurality of luminous fluxes each having a band-like shape in the vertical direction. These luminous fluxes are passed through the ultraviolet absorbing filter 44 and the second cylinder array 43b to result in a plurality of images of the light source near the polarization conversion element 45 (a plurality of light source images each having a band-like shape in the vertical direction).

The polarization conversion element 45 is constituted by polarization beam splitting surfaces, reflecting surfaces, and half-wave plates. Each of the luminous fluxes enters the polarization beam splitting surface corresponding to its row and is divided into a P-polarized light component to be transmitted through the polarization beam splitting surface and an S-polarized light component to be reflected by the polarization beam splitting surface. The reflected S-polarized light component is then reflected by the reflecting surface and emerges in the same direction as the P-polarized light component. On the other hand, the transmitted P-polarized light component is transmitted through the half-wave plate and changed into the same polarized light component as the S-polarized light component. Thus, the light components polarized in the same direction emerge from the polarization conversion element 45.

The plurality of luminous fluxes (the plurality of luminous fluxes each having a band-like shape in the vertical direction) after the polarization conversion are passed through the front compressor 46 and enter the reflecting mirror 47 to be reflected thereby to have an angle of 88 degrees with respect to the incident angle. Then, the light enters the third cylinder array 43c.

The luminous flux entering the third cylinder array 43c is then split into a plurality of luminous fluxes through the respective cylinder lenses and collected thereby. The light is transmitted through the fourth cylinder array 43d and thus changed into a plurality of luminous fluxes (a plurality of luminous fluxes each having a band-like shape in the horizontal direction) to reach the condenser lens 48 and then the rear compressor 49.

With the optical actions of the front compressor 46, the condenser lens 48 and the rear compressor 49, the abovementioned plurality of luminous fluxes form a uniform rectangular illumination area by the overlap of their rectangular images. The display surfaces of the reflective liquid crystal panels 61R, 61G, and 61B are disposed in the illumination area. Next, the S-polarized light converted by the polarization conversion element 45 then enters the dichroic mirror 58. The dichroic mirror 58 reflects blue light (with wavelengths from 430 to 495 nm) and red light (with wavelengths from 590 to 650 nm) and transmits green light (with wavelengths from 505 to 580 nm).

Next, the optical path of the green light will be described. The green light transmitted through the dichroic mirror 58 then enters the incident-side polarizing plate 59. The green light remains as P-polarized light (S-polarized light when the polarizing conversion element 45 is used as the reference) after the separation by the dichroic mirror 58. The green light emerges from the incident-side polarizing plate 59, and then enters the first polarization beam splitter 60 as P-polarized light and is transmitted through the polarization beam splitting surface thereof to reach the reflective liquid crystal panel 61G for G. The reflective liquid crystal panel 61G for G image-modulates the green light and reflects it. The P-polarized light component of the image-modulated green reflected light is again transmitted through the polarization beam splitting surface of the first polarization beam splitter 60, returned toward the light source, and removed from light for projection. On the other hand, the S-polarized light component of the image-modulated green reflected light is reflected by the polarization beam splitting surface of the first polarization beam splitter 60 and is directed toward the dichroic prism 69 as light for projection.

When all the polarized light components are converted into P-polarized light (black displayed), the slow axis of the quarter-wave plate 62G provided between the first polarization beam splitter 60 and the reflective liquid crystal panel 61G for G can be adjusted in a predetermined direction to reduce the influence of a disturbed polarization state caused in the first polarization beam splitter 60 and the reflective liquid crystal panel 61G for G.

The green light emerging from the first polarization beam splitter 60 then enters the dichroic prism 69 as S-polarized light, is reflected by the dichroic film surface of the dichroic prism 69, and is directed toward the projection lens 5.

On the other hand, the red light and the blue light reflected by the dichroic mirror 58 enter the incident-side polarizing plate 64b. The red light and the blue light remain as P-polarized light after the separation by the dichroic mirror 58. The red light and the blue light are passed through the trimming filter 64a to remove the orange light thereof, emerge from the incident-side polarizing plate 64b, and then enter the color-selective phase plate 65.

The color-selective phase plate 65 has the function of rotating the polarization direction of only red light by 90 degrees. Thus, the red light and the blue light enter the second light beam splitter 66 as S-polarized light and P-polarized light, respectively. The red light entering the second polarization beam splitter 66 as S-polarized light is then reflected by the polarization beam splitting surface of the second polarization beam splitter 66 to reach the reflective liquid crystal panel 61R for R. The blue light entering the second polarization beam splitter 66 as P-polarized light is then transmitted through the polarization beam splitting surface of the second polarization beam splitter 66 to reach the reflective liquid crystal panel 61B for B.

The red light entering the reflective liquid crystal panel 61B for R is then image-modulated and reflected thereby. The S-polarized light component of the image-modulated red reflected light is reflected again by the polarization beam splitting surface of the second polarization beam splitter 66, returned toward the light source, and removed from light for projection. On the other hand, the P-polarized light component of the image-modulated red reflected light is transmitted through the polarization beam splitting surface of the second polarization beam splitter 66 and directed toward the dichroic prism 69 as light for projection.

The blue light entering the reflective liquid crystal panel 61B for B is then image-modulated and reflected thereby. The P-polarized light component of the image-modulated blue reflected light is then transmitted again through the polarization beam splitting surface of the second polarization beam splitter 66, returned toward the light source, and removed from light for projection. On the other hand, the S-polarized light component of the image-modulated blue reflected light is then reflected by the polarization beam splitting surface of the second polarization beam splitter 66 and directed toward the dichroic prism 69 as light for projection.

The slow axes of the quarter-wave plates 62R and 62B provided between the second polarization beam splitter 66 and the reflective liquid crystal panels 61R and 61B for R and B can be adjusted to achieve control of black display for the red light and the blue light, respectively.

Of the red light and blue light for projection combined into one luminous flux and emerging from the second polarization beam splitter 66 in this manner, the blue light is analyzed by the emergence-side polarizing plate 68B and enters the dichroic prism 69. The red light is transmitted through the polarizing plate 68B with no change as P-polarized light and enters the dichroic prism 69. The analysis by the emergence-side polarizing plate 68B removes any invalid component of the blue light caused by passing the second polarization beam splitter 66, the reflective liquid crystal panel 61B, and the quarter-wave plate 62B.

The red light and blue light for projection entering the dichroic prism 69 are transmitted through the dichroic film surface of the dichroic prism 69, combined with the green light reflected by the dichroic film surface, and reach the projection lens 5.

The combined red, green, and blue light for projection is enlarged and projected by the projection lens 5 onto a projection surface such as a screen.

Since the optical paths described above are used when the reflective liquid crystal panels operate for white display, description will hereinafter be made of optical paths when the reflective liquid crystal panels operate for black display.

First, the optical path of the green light will be described. The P-polarized light component of the green light transmitted through the dichroic mirror 58 then enters the incident-side polarizing plate 59 and the first polarization beam splitter 60, is transmitted through the polarization beam splitting surface thereof, and reaches the reflective liquid crystal panel 61G for G. Since the reflective liquid crystal panel 61G is in a black display state, the green light is reflected without image-modulation. Thus, the green light remains as P-polarized light after the reflection by the reflective liquid crystal panel 61G. The green light is again transmitted through the polarization beam splitting surface of the first polarization beam splitter 60 and the incident-side polarizing plate 59, returned toward the light source, and removed from light for projection.

Next, the optical paths of the red light and blue light will be described. The P-polarized light components of the red light and blue light reflected by the dichroic mirror 58 then enter the incident-side polarizing plate 64b after they pass the trimming filter 64a. They emerge from the incident-side polarizing plate 64b and then enter the color-selective phase plate 65. The color-selective phase plate 65 has the function of rotating the polarization direction of only the red light by 90 degrees. Thus, the red light and the blue light enter the second light beam splitter 66 as S-polarized light and P-polarized light, respectively.

The red light entering the second polarization beam splitter 66 as the S-polarized light is then reflected by the polarization beam splitting surface of the second polarization beam splitter 66 and reaches the reflective liquid crystal panel 61R for R. The blue light entering the second polarization beam splitter as the P-polarized light is then transmitted through the polarization beam splitting surface of the second polarization beam splitter 66 and reaches the reflective liquid crystal panel 61B for B.

Since the reflective liquid crystal panel 61R for R is in a black display state, the red light incident on the reflective liquid crystal panel 61R for R is reflected without image-modulation. In other words, the red light remains as the S-polarized light after the reflection by the reflective liquid crystal panel 61R for R. Thus, the red light is again reflected by the polarization beam splitting surface of the second polarization beam splitter 66, transmitted through the color-selective phase plate 65 and the incident-side polarizing plate 64b, returned toward the light source, and removed from light for projection. As a result, black is displayed.

The blue light entering the reflective liquid crystal panel 61B is then reflected without image-modulation since the reflective liquid crystal panel 61B for B is in a black display state. In other words, the blue light remains as the P-polarized light after the reflection by the reflective liquid crystal panel 61B for B. Thus, the blue light is again transmitted through the polarization beam splitting surface of the second polarization beam splitter 66, the color-selective phase plate 65, and the incident-side polarizing plate 64b, returned toward the light source, and removed from light for projection. The projector which employs the reflective liquid crystal panels (the reflective optical modulation elements) has the optical structure and optical effects as described above.

In Embodiments 1 to 8 described above, the space between the reflective liquid crystal panel and the transparent substrate to which the quarter-wave plate is attached is used as the dustproof space. However, the film-type optical function member attached to the transparent substrate is not limited to the quarter-wave plate, and may be realized by a polarizing element or a wave plate other than the quarter-wave plate. Also, a reflective optical modulation element other than the reflective liquid crystal panel may be used.

In Embodiments 4 and 5, the duct for guiding the cooling wind to the central area of the transparent substrate is formed integrally with the holder for holding the transparent substrate to which the quarter-wave plate is attached. However, the duct may be formed in the prism base or the like of the projection optical unit as a component separate from the holder. The duct is preferably rotatable such that it can face the central area of the light-transmissive substrate or the quarter-wave plate in association with the rotation of the quarter-wave plate, similarly to Embodiments 4 and 5.

The liquid crystal element units described above in Embodiments 1 to 5 are merely illustrative, and the present invention includes a different structure in which a cover member surrounds the space between a transparent substrate to which a film-type optical function member is attached and a reflective optical modulation element. In addition, the liquid crystal element units in Embodiments 1 to 5 can be used not only for the projection optical unit or projector described in Embodiments 6 to 8 but also for projection optical units or projectors of various structures which includes a reflective optical modulation element and a film-type optical function member used in combination.

As described above, according to Embodiments 1 to 8, the cover member surrounds the space between the light-transmissive substrate to which the film-type optical function member is attached and the reflective optical modulation element to realize the dustproof structure in which the light-transmissive substrate necessary for holding the film-type optical function member is also used as the part for preventing dust from adhering to the reflective optical modulation element. In addition, the cover member surrounds the space between the light-transmissive substrate and the reflective optical modulation element and does not surround the area outside the space along the light-transmissive substrate, so that the film-type optical function member attached to the light-transmissive substrate can be cooled directly or via the light-transmissive substrate from the outside of the space.

Therefore, the use of the optical modulation element unit can realize the projection optical unit and the image projection apparatus which allow projection of a bright image for display with high quality.

Furthermore, the present invention is not limited to these preferred embodiments and various variations and modifications may be made without departing from the scope of the present invention.

This application claims a foreign priority benefit based on Japanese Patent Applications Nos. 2005-162047, filed on Jun. 1, 2005, and 2006-144356, filed on May 24, 2006, each of which is hereby incorporated by reference herein in its entirety as if fully set forth herein.

What is claimed is:

1. An optical modulation element unit comprising:
   a light-transmissive substrate;
   a film-type optical function member attached to the light-transmissive substrate;
   a reflective optical modulation element placed, at a predetermined distance, substantially parallel to the light-transmissive substrate;
   a cover member which surrounds a dustproof space between the light-transmissive substrate and the reflective optical modulation element; and
   a holding member which holds the light-transmissive substrate;
   wherein the holding member has an air guiding portion which guides an air flow to an air flow space along a first surface of the light-transmissive substrate, the first surface being a surface facing away from the reflective optical modulation element;
   wherein the cover member is formed so as not to surround the air flow space along the first surface; and
   wherein the film-type optical function member is attached to a second surface of the light-transmissive substrate, the second surface being a surface facing towards the reflective optical modulation element.

2. The optical modulation element unit according to claim 1, wherein the light-transmissive substrate has a photoelastic constant equal to or lower than 1.0 nm/cm/$10^5$ Pa.

3. The optical modulation element unit according to claim 1, wherein the light-transmissive substrate has a heat conductivity equal to or higher than 0.9 w/mK.

4. The optical modulation element unit according to claim 1, further comprising a light-transmissive cover plate which covers an entrance/emergence surface of the reflective optical modulation element, wherein the light-transmissive cover plate has a photoelastic constant equal to or lower than 1.0 nm/cm/$10^5$ Pa.

5. The optical modulation element unit according to claim 1, further comprising a light-transmissive cover plate which covers an entrance/emergence surface of the reflective optical modulation element, wherein the light-transmissive cover plate has a heat conductivity equal to or higher than 0.9 W/mK.

6. The optical modulation element unit according to claim 1, wherein, in a case where the optical modulation element unit is used in a projection optical unit which projects light from the reflective optical modulation element, the projection optical unit having an optical element which is disposed on the side opposite to the reflective optical modulation element with respect to the light-transmissive substrate, the optical modulation element unit is disposed in the optical unit so as to form a path of the air flow between the light-transmissive substrate and the optical element.

7. The optical modulation element unit according to claim 1, further comprising a heat radiation member disposed on the back of the reflective optical modulation element.

8. The optical modulation element unit according to claim 1, wherein the holding member and the air guiding portion are rotatable around an axis which passes through the film-type optical function member.

* * * * *